(12) United States Patent
Chien

(10) Patent No.: US 8,277,087 B2
(45) Date of Patent: Oct. 2, 2012

(54) LED LIGHT HAS MORE THAN ONE REFLECTIVE MEANS TO CREATE MULTIPLE IMAGES

(76) Inventor: Tseng-Lu Chien, Walnut, CA (US)

(*) Notice: Subject to any disclaimer, the term of this patent is extended or adjusted under 35 U.S.C. 154(b) by 0 days.

(21) Appl. No.: 12/710,918

(22) Filed: Feb. 23, 2010

(65) Prior Publication Data

US 2010/0213879 A1 Aug. 26, 2010

(51) Int. Cl.
*F21V 7/00* (2006.01)
(52) U.S. Cl. .................................... 362/298; 362/241
(58) Field of Classification Search .................. 362/232, 362/233, 249.02–1, 249.03, 297–301, 296.01, 362/311.01, 235, 644, 641, 285, 277, 249.07, 362/241, 240
See application file for complete search history.

(56) References Cited

U.S. PATENT DOCUMENTS

| | | | | |
|---|---|---|---|---|
| 5,743,616 A * | 4/1998 | Giuliano et al. | ............. | 362/612 |
| 6,805,465 B2 * | 10/2004 | Chen | ............................ | 362/246 |
| 7,102,172 B2 * | 9/2006 | Lynch et al. | ..................... | 257/79 |
| 7,144,132 B2 * | 12/2006 | Trini Castelli | ................ | 362/246 |
| 2005/0207156 A1 * | 9/2005 | Wang et al. | ..................... | 362/240 |
| 2005/0280756 A1 * | 12/2005 | Kim et al. | ...................... | 349/114 |
| 2008/0074901 A1 * | 3/2008 | David et al. | ................... | 362/612 |

\* cited by examiner

*Primary Examiner* — Julie Shallenberger
(74) *Attorney, Agent, or Firm* — Bacon & Thomas, PLLC

(57) ABSTRACT

An LED night light having different power sources including a battery, outlet plug-in power source, or interchangeable power source incorporates more than one reflective means with desired relative positions, distances, and/or orientations to create plurality of LED or LEDs image on at least one surface of the night light. At least one of the reflective means can be a see-though surface to permit the plurality of LED images to be seen through the reflective means. An LED light device having power and cost saving features is also provided.

7 Claims, 6 Drawing Sheets

(A-1) 90

(A-2) < 90
around 75

(A-3) < 90
around 45

(A-4) < 90
around 30

(A-5) < 90
tilt angle (A-6) Triangle

LED LIGHT HAS MORE THAN ONE REFLECTIVE MEANS TO CREATE MULTIPLE IMAGES

BACKGROUND OF THE INVENTION

This application has subject matter in common with U.S. patent application Ser. Nos. 12/710,561; 12/711,456; 12/771,003; 12/624,621; 12/622,100; 12/318,471; 12/318,470; 12/318,473; 12/292,153; 12/232,505; 12/232,035; 12/149,963; 12/149,964; 12/073,095; 12/073,889; 12/007,076; 12/003,691; 12/003,809; 11/806,711; 11/806,285; 11/806,284; 11/566,322; 11/527,628; 11,527,629; 11/498,874; 12/545,992; 12/806,711; 12/806,285; 12/806,284; 12/566,322; 12/527,628; 12/527,629; 12/527,631; 12/502,661; 11/498,881; 11/255,981; 11/184,771; 11/152,063; 11/094,215; 11/092,742; 11/092,741; 11/094,156. 11/094,155. 10/954,189; 10/902,123, 10/883,719; 10/883,747; 10/341,519; 12/545,992; and 12/292,580.

In particular, the following applications show light devices that have at least some features in common with included or optional features of the LED light device of the present invention: Ser. Nos. 12/710,561 ("LED power failure Light"); 12/711,456 ("LED light device has special effects"); 12/771,003 ("LED light device has more than 1 reflective means for plurality of image"); 12/624,621 ("projection device or assembly for variety of LED light"); 12/622,000 ("Interchangeable Universal Kits for all LED light"); 12/318,471 ("LED night light with pinhole imaging"); 12/318,470 ("LED night light with Projection features"); 12/318,473 ("LED night light with laser or hologram element"); 12/292,153 ("LED night light with Projection or imaging features"); 12/232,505 ("LED night light with Projection features"); 12/149,963 ("Removable LED light device"); 12/149,964 ("Surface Mounted Device with LED light"); 12/073,095 ("LED Track light device"); 12/073,889 ("LED light with changeable position with Preferable power source"); 12/007,076 ("LED light with changeable geometric system"); 12/003,691 ("LED light with changeable geometric dimension features"); 12/003,809 ("LED light with changeable features"); 11/806,711 ("Multiple LED light with adjustable angle features"); 11/806,285 ("LED Night light with outlet device"); 11/806,284 ("LED Night light with more than 1 optics means"); 11/527,628 ("Multiple function Night light with air freshener"); 11/527,629 ("LED Night light with interchangeable display unit"); 11/498,874 ("Area illumination Night light"); 11/527,631 ("LED Time piece night light"); 12/545,992 ("LED time piece Night light"); 12/292,580 ("LED Time Piece Night light"); 11/498,881 ("Poly Night light"); 11/255,981 ("Multiple light source Night Light"); 11/184,771 ("Light Device with EL elements"); 11/152,063 ("Outlet adaptor with EL"); 11/094,215 ("LED night light with liquid medium"); 11/094,215 ("LED Night light with Liquid optics medium"); 11/092,741 ("Night light with fiber optics"); 10/883,747 ("Fiber Optic light kits for footwear"); 11/498,874 ("Area Illumination for LED night light"); 11/527,629 ("Time Piece with LED night light"); 11/527,628 ("Multiple Function Night light with Air Freshener"); 11/806,284 ("LED Night light with more than one optics mediums"); 11/806,285 ("LED Night Light with multiple function"); and 11/806,711 ("Multiple LEDs Light with adjustable angle function").

The applications of the inventor in general all apply physics or optics theory to a night light supplied with power from an outlet, battery, solar, or other power source. The present invention uses the physics or optics theory to create a plurality of LED light images on a surface. More specifically, the current invention uses more than one reflective means to transform a single LED spot light into a plurality of images on a surface to be seen by viewer. The principles of the invention may be applied to night lights of various types, including night lights disclosed in the above-listed patents and patent applications of the inventor, which may be powered by a variety of power sources, such as an outlet, batteries, solar, wind, or chemical power sources.

Because of the persistence of vision effect, caused by the human eye response time of more than $\frac{1}{24}$ (41,67) to $\frac{1}{16}$ (0.0625) seconds, when an object moves faster than the human eye response time, the last image will stay in the human eye and brain for an extended period of time. This theory can utilized to save power by causing an LED or LEDs to flash with a very short on-time of around 10 msec or less. This principle is similar to that of a motion picture in which, if an object in front of human eye is displayed in 16-24 pictures per second, people will think all pictures are continuous. Hence, the current invention uses a related circuit, control means, IC, and/or micro controller to cause an LED light device to blink at a rate that is much faster than 16-24 times (cycles) per second, with the LED or LEDs being turned on for 10% of each cycle and off for 90% of the cycle to save up to 90% of power consumption or increase battery life by nine times more than the full steady-ON condition. This is a significant power saving for all battery power source applications. It will be appreciated that new LEDs may be coming soon to enable the LEDs to have an even quicker response time of less than 10 msec, and possibly less than 5 msec or 2 msec, to provide even greater power saving. such adjustment of the duration of each cycle's turn-on and turn-off duration time will cause even more power saving to meet the green world concept. This is one of the very important concepts of the current invention.

Further cost saving can be achieved in the case of a battery powered unit by using a circuit with proper electric components, parts, and accessories to raise the voltage output of the batteries to trigger the LED or LEDs even though the number of batteries is less than that normally required to generate the required voltage. This can counter the tendency of people to use a large quantity of batteries and save substantial cost, which is another important advantage of the current invention.

A preferred embodiment of the invention includes an LED night light with more than one reflective means that provide a plurality of LED images, the LED night light including at least one LED arranged on the first reflective means, at least one second reflective means which can reflect an LED image from its surface back to the first reflective means surface. In this embodiment, a plurality of the LED images can be seen on a surface in a desired arrangement based on the relative position or orientation between the first and second reflective means. Furthermore, at least one of the reflective means may be partially transparent so that the plurality of LED images is visible on the surface thereof. The LED or LEDs of this embodiment are preferably connected with circuit means, power means, contact means, conductive means, switch means, sensor means, printed circuit means, integrated circuit (I.C.) means and/or related parts and accessories to cause the LED or LEDs to turn on and off according to a predetermined time period, functions, colors, and/or effects to provide a desired lighting performance.

In the above-described preferred embodiment, the reflective means may be a mirror, chrome finished piece, polished piece, double-side mirror, or any surface having reflective properties suitable to reflect the desired images. The partial transparent or see-though properties can be provided by a transparent piece, colored transparent piece, or any other piece that allows light beams to pass therethrough. A power source of this embodiment can be in the form of an outlet, batteries, solar power, chemical power, or wind power. The other reflective means of this embodiment may be positioned anywhere in three-dimensional space including the top and four sides of the night light and may have any geometric shape and arrangement to provide a desired number and arrangement of the plurality of images on any surface for use indoors, outdoors, and anywhere. The LED or LEDs can be selected from any combination of single color, multiple color, multiple piece, standard, and special LED assemblies available on the market. Finally, the distance, position, and/or orientation between the reflective means may be changed to change the number, position, geometric arrangement, and brightness of the plurality of images.

According to another preferred embodiment of the invention, an LED light device having power saving features includes at least one LED or LEDs for a light source, at least one housing having space to install circuit means, conductive means, electric components parts and accessories, switch means, sensor means, an integrated circuit (IC), and/or a micro controller to connect with a conventional market-available power source to cause the LED or LEDs to turn on and turn to provide predetermined functions or effects, with a predetermined duty cycle, color, and/or brightness.

The power-saving features are obtained by using the control means to cause the LED or LEDs turn-on for only a certain percentage of each cycle. In particular, the turn on time is selected to meet the persistence of vision of the human eye, so as to take advantage of the human eye's response time of $\frac{1}{24}$ to $\frac{1}{16}$ second so that the blinking LED or LEDs looks as if it were continuously on.

According to yet another embodiment of the invention, an LED light device having cost saving features includes at least one LED or LEDs as a light source, at least one housing having space to install circuit means, conductive means, electric components parts and accessories, switch means, sensor means, an integrated circuit (IC), and/or a micro controller to connect with a conventional market-available power source, preferably batteries, to cause the LED or LEDs to turn on and turn off according to a predetermined function or effects, duty cycle, color, and/or brightness.

In this embodiment, cost saving is obtained by providing batteries having a total voltage that is less than the LED trigger voltage and by providing electric components and related parts and accessories to increase the voltage output of the batteries to greater than the LED trigger voltage.

As noted above, the current invention uses more than one reflective means to create a plurality of LED images based on the geometric arrangement of the reflective means. The relative distance, position, and/or orientation of the first and second reflective means (and optional additional) reflective means will result in different image performance. This is a very low cost and simple way to make a splendid and eye catching light unit for people, with any desired power source such as a battery, USB power, outlet power, generator power, chemical power, solar power, wind power or other equivalent power source from the marketplace.

BRIEF DESCRIPTION OF THE DRAWINGS

FIGS. 3*a* to 3*j* the first preferred embodiment with different distances, positions, and orientations of the first reflective means and second reflective means (or all other reflective means).

DETAILED DESCRIPTION OF THE PREFERRED EMBODIMENTS

Figure 4:
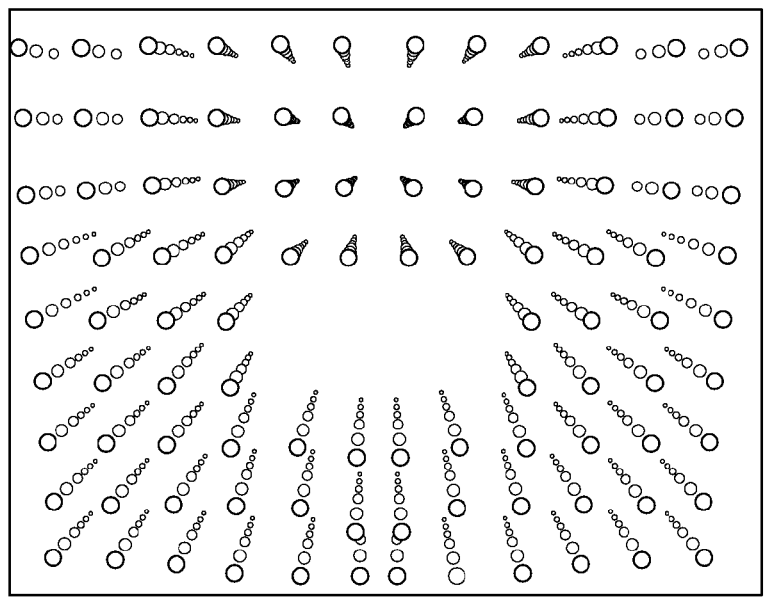
FIG. 4 shows one of the splendid light images created by the current invention in a yellow color image.
Figure 5:
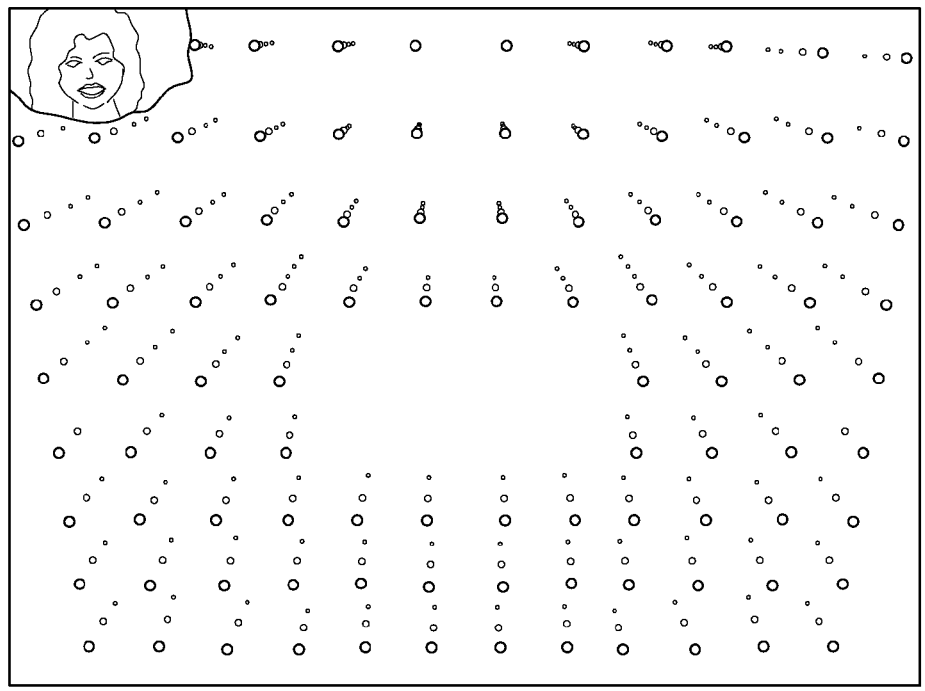
FIG. 5 shows another one of the splendid light images created by the current invention in a blue color image.

FIGS. 4 and 5 show a first preferred embodiment for causing a plurality of LED or LEDs images to be seen on a surface. As shown in FIG. 4, nine LEDs are arranged on one row and eight LEDs in a column for a total of 72 LEDs in two side areas. In addition, seven LEDs are arranged in one row and four LEDs in a column for a total of 28 LEDs in a center area. Adding more than one reflective means can cause each LED to appear in more than three (and up to N) images along a z-axis with a straight or curved line arrangement. The same effects can be seen in FIG. 5, which has a different color of all the LEDs images because multiple color LEDs are incorporated, with appropriate circuit means, power means, contact means, conductive means, switch means, sensor means, printed circuit means, integrated circuit (I.C.) means and related parts and accessories to cause the LED or LEDs in the plurality of images to turn on and off according to a predetermined time period, functions, colors, and effects, to exhibit a desired performance to viewers.

The theory behind creation of the plurality of LED or LEDs images is physics optics theory, which applies more than one reflective means to at least one LED arranged on the first reflective means. At least second reflective means reflects the LED image from its surface back to the surface of the first reflective means. The plurality of LED images can be seen on the surface in a desired arrangement based on the relative position or orientation between the first reflective means and others reflective means(s). At least one of the reflective means enables light to pass through to enable the viewer to see the plurality of LED images on its surface.

Figure 3:
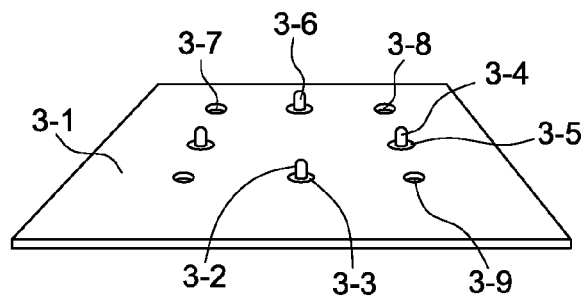
FIG. 3 an arrangement of LED or LEDs on the first reflective means of the first preferred embodiment.

FIG. 3 shows a preferred embodiment in which the first reflective means (3-1) has several pre-arranged holes (3-3) (3-5) to allow the LEDs (3-2) (3-4) to be installed on these holes and in which some of LEDs (3-7) (3-8) (3-9) are lower than the first reflective surface arrangement. The LEDs (3-2) (3-4) (3-6) are arranged to be higher than the first reflective surface (3-1). Both can be workable for the current invention with only a slight difference in light performance.

Figure 3A:
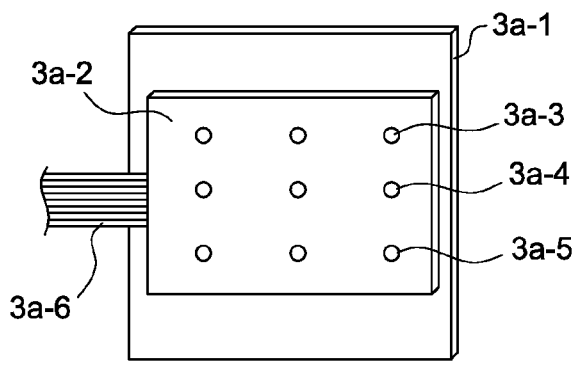
FIG. 3*a* further illustrates the first preferred embodiment having first reflective means, a circuit board, conductive means, and an LED or LEDs arrangement.

FIG. 3*a* shows a printed circuit board (PCB) (3*a*-2) for use in the first preferred embodiment, the printed circuit board (3a-2) having nine LEDs installed thereon, including LEDs (3a-3) (3a-4) (3a-5), all nine LEDs being arranged to fit within the first reflective means (3a-1)'s nine holes (not shown). The PCB is connected with the conductive means to allow the electric signals to drive the LEDs to turn on and off according to a predetermined time period, functions, colors, and/or effects, to offer a desired light performance to viewers.

Figure 3B:
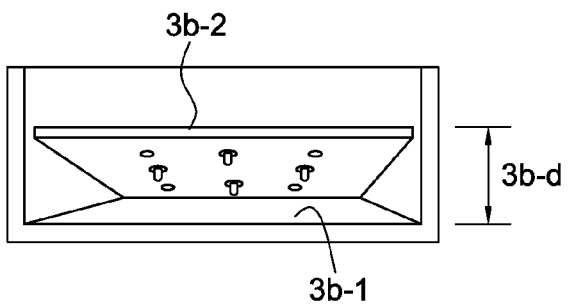
Figure 3C:
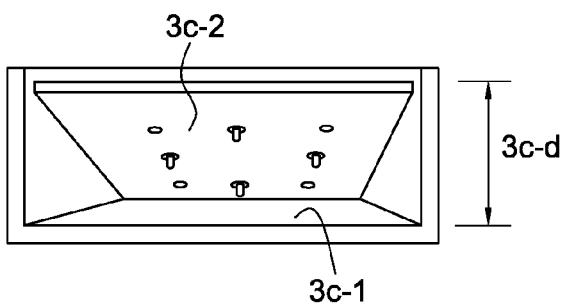
Figure 3D:
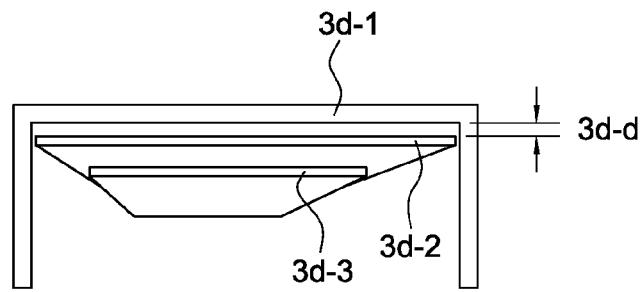

FIGS. 3b-3j show a preferred embodiment in which different distances, positions, and/or orientations between the first reflective means and second or other reflective means will create different light images. In FIGS. 3b and 3c, the first reflective means is tilted relative to the second reflective means but with a different angle and distance (3b-d) (3c-d) so that the plurality of LED images change according to the change in the tilt angle and distance to meet different market requirement.

Figure 3E:
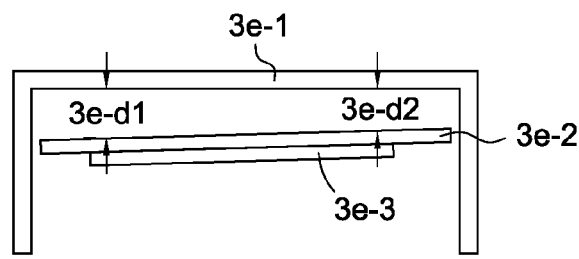
Figure 3F:
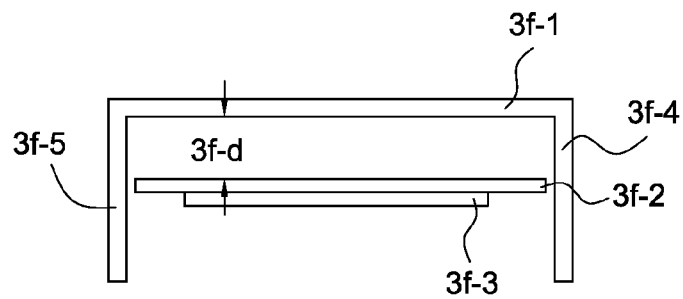
Figure 3G:
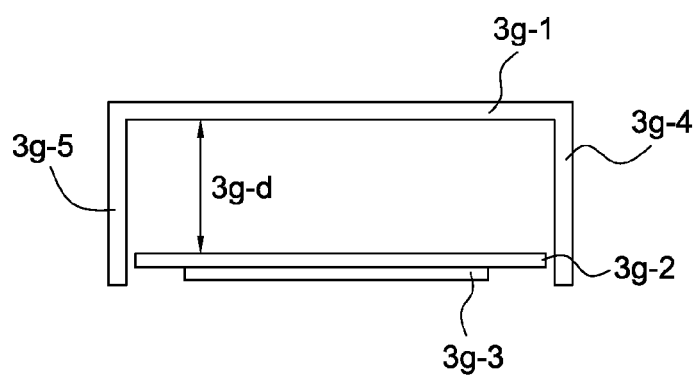
Figure 3H:
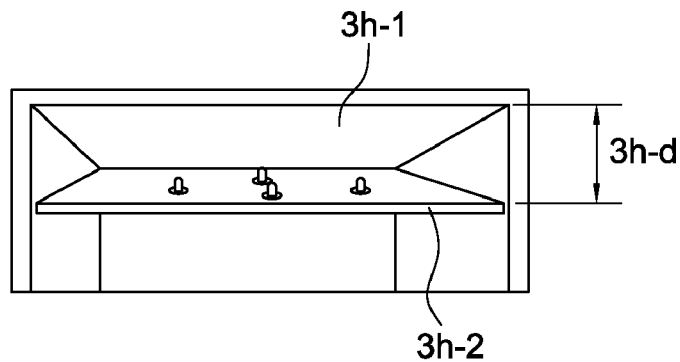
Figure 3I:
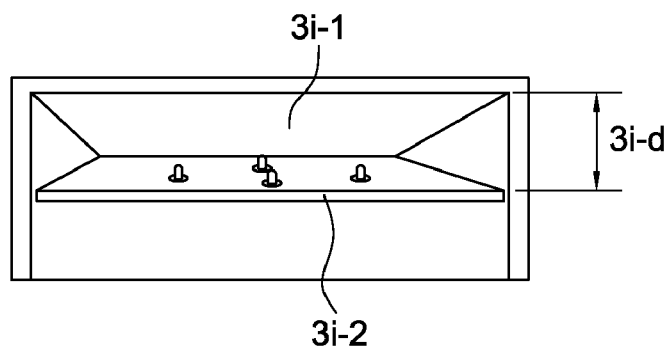
Figure 3J:
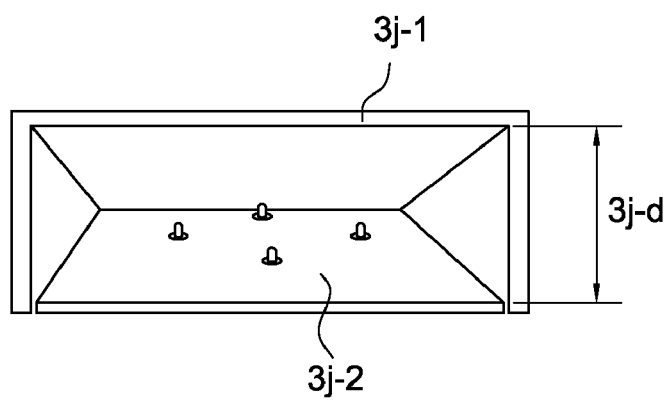

FIGS. 3d, 3e, 3f, and 3g show the first reflective means (3d-2) (3e-2) (3f-2) (3g-2) at different distances from the second reflective means (3d-1) (3e-1) (3f-1) (3g-1) and that each first reflective means has a PCB (3d-3) (3e-3) (3f-3) (3g-3) on its back with LEDs (not shown) fixed on each PCB. The distance between the first reflective means and the second reflective means as shown in FIGS. 3d, 3e, 3f, and 3g is (3d-d) (3e-d1) (3e-d2) (3f-d) (3g-d). The relative distances, positions, and/or orientations are changed to change the plurality of image's number, position, geometric arrangement, and/or brightness. As shown in FIG. 3e, there are two distances (3e-d1) (3e-d2) so that the first reflective means is tilted relative to the second reflective means to accommodate special requirements.

Figure 1:
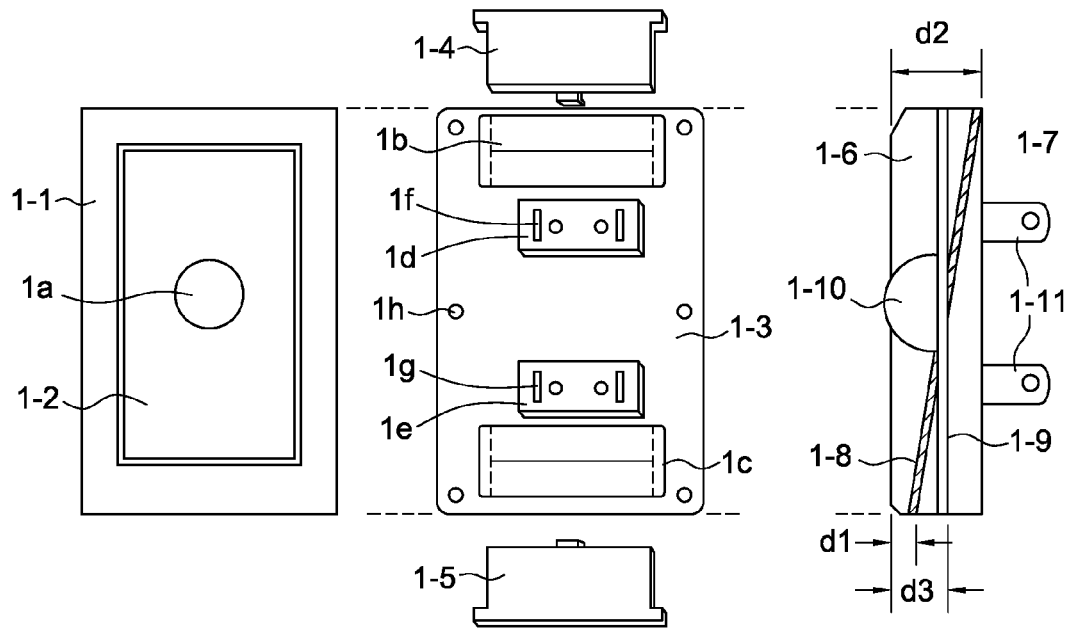
FIG. 1 shows a first preferred embodiment of the current invention with first reflective means and second reflective means to cause a plurality of images to be seen by a viewer.
Figure 2:
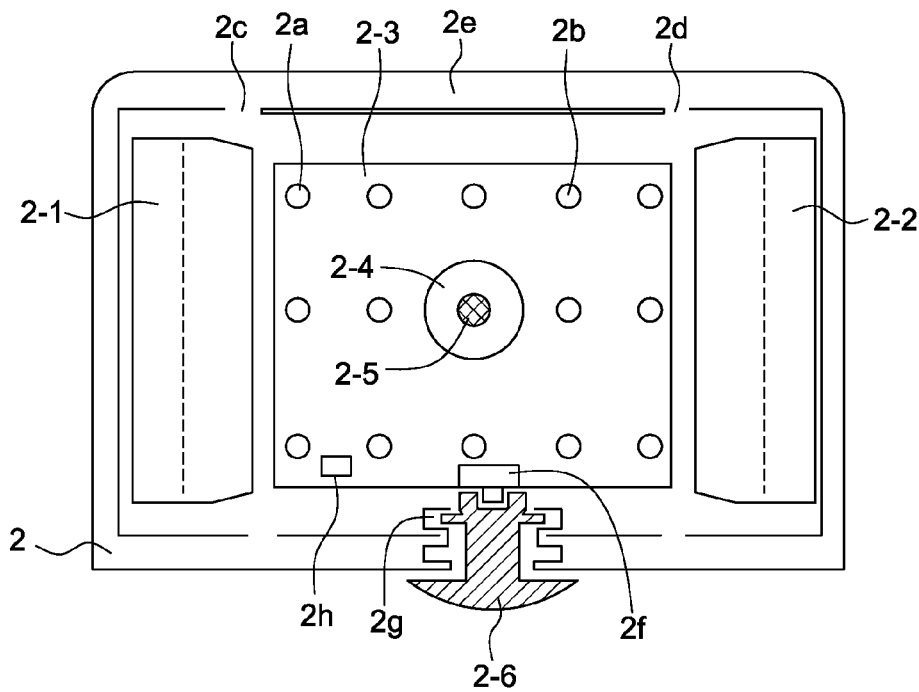
FIG. 2 shows a preferred construction for an inner side of the first preferred embodiment for LED or LEDs on the first reflective means and a space arrangement of the lower housing.

FIGS. 1 and 2 show preferred structures for implementing the first preferred embodiment of the current invention whose LED images are illustrated in FIGS. 4 and 5. FIG. 2 shows the interior arrangement of the preferred structure. The lower housing (2e) has a wall for cosmetic purposes and a battery compartment (2-1) (2-2) and first reflective means (2-3) inside the wall. The wall has some opening channels (2c) (2d) to allow conductive means to pass though and make electric connection with the power source and circuit PCB (not shown) under the first reflective means (2-3). The LEDs (2a) (2b) are fixed on the first reflective means (2-3), which may be tilted to allow a better arrangement of the LEDs' images to be seen by the viewer. One switch means, control means, or sensor means (2-5) can be installed in the hole (2-4) at the center of the first reflective means to allow a desired function of manually or automatically turning on the LED or LEDs according to a predetermined function, time period, color change, effects, and/or performance. The two battery compartments can receive a desired number of batteries to provide special functions such as power failure light functions, which turn on some of the LEDs for super brightness and provide emergency light. An additional control switch/sensor (2h) (2f) can be designed on a lower circuit board (not shown) and connected with other means (2-6) to switch the system from OFF to Auto-Steady ON for a desired number of LED or LEDs, to provide a desired function.

FIG. 1, shows a front cover having a frame (1-1) and second reflective means (1-2) assembled together with the frame. The center has one hole to allow the inner sensor/switch means (1-10) to be accessed from outside of the unit. The lower housing (1-3) has two battery compartments (1b) (1c) with room to allow a desired number of batteries to fit within and offer power to LED or LEDs for certain function such as power failure or emergency light functions in which a certain number of LED or LEDs are turned on for super brightness illumination. The batteries can be non-rechargeable or rechargeable depending on the function needed. The batteries also can also provide a power source for all LEDs to provide a plurality of LED image light functions if people want to use the light device as a desk top night light instead of an outlet plug-in power source.

The battery power source and outlet plug-in power source can be made interchangeable, as described for example in copending U.S. patent application Ser. Nos. 12/624,621, filed on Nov. 24, 2009 and entitled "Projection Device or Assembly for a Variety of LED Lights," and 12/622,000, filed on Nov. 24, 2009 and entitled "Interchangeable Universal Kits for All LED Light"

FIG. 1 shows an alternative arrangement of an interchangeable power source than the one illustrated in above-cited copending U.S. patent application Ser. No. 12/622,000. The arrangement illustrated herein uses two power sources on the unit. However, it will still fall within the scope of the invention to provide for switching from battery to outlet plug-in by including an extra switch/control means (2f) and (2-6) to implement the interchange function.

As shown in FIG. 1, the lower housing has an outlet plug-in prong means (1d) (1e) which can be added to the lower housing if the market requires an outlet plug-in prong as the power source. If not required, one can use two same size plastic means with double side tape or Velcro tape to enable the exclusively battery-powered unit to be mounted on a wall or any desired surface.

As further illustrated in FIG. 1, the front cover (1-6) has one switch/sensor means (1-10) to provide the on/off function and the second reflective means (1-2) on its frame (1-1), which will reflect all LED or LEDs (in an x-y plane) and its image back and forth with respect to the first reflective means (1-8) and (1-6). The second reflective means (1-2) may have see-through properties so that a plurality of LED or LEDs images will appear on the first reflective means (1-8) to obtain a lot of LED images with desired color and geometric arrangement along the Z-axis. This will let people enjoy this kind of lighting effect in desired environments.

The first reflective means (1-8) can be at a desired location and orientation or position. For example it may be tilted such as the distance (d2) of the top of the first reflective means with respect to the cover is different from the distance (d1) of the bottom of the first reflective means with respect to the cover. It also can be parallel to the front cover at a distance (d3) to get different LED or LED images on the first reflective means.

Figure 6:
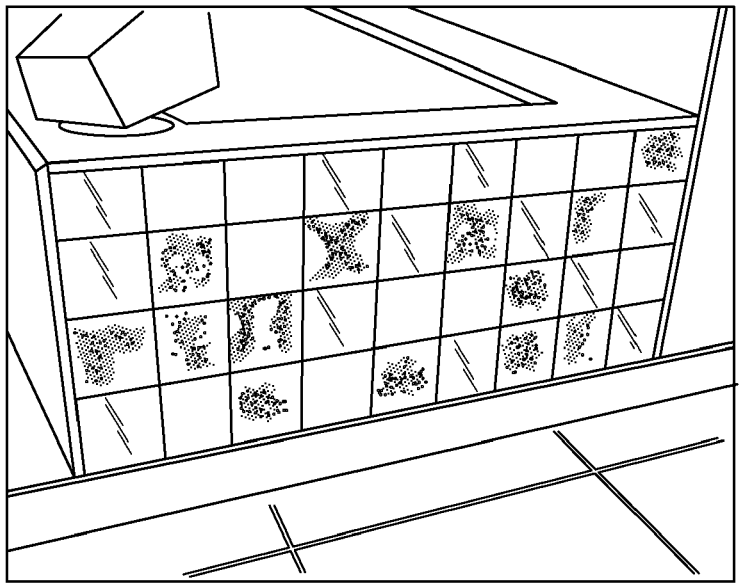
FIG. 6 shows an application involving a rectangular glass brick which uses an LED light device of the invention to create a splendid plurality of LED images to be seen from two sides of the brick.

FIG. 6 shows an application to a rectangular glass brick, which utilizes the LED light device of the current invention to create a splendid plurality of LED images to be seen from two sides of the brick.

Figure 7:
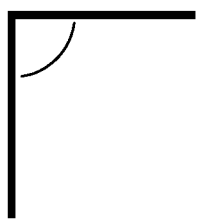
FIG. 7 shows an arrangement with more than one reflective surface side-by-side at different angles to create different images.
Figure 7:
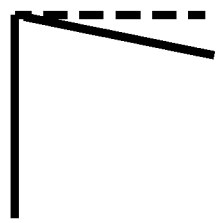
Figure 7:
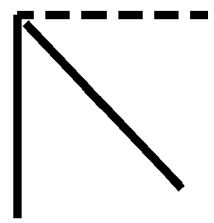
Figure 7:
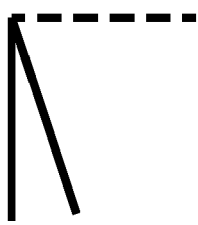
Figure 7:
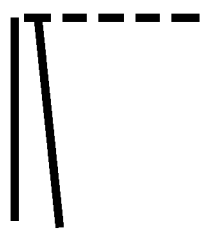
Figure 7:
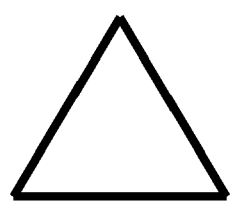

FIG. 7 shows an arrangement having more than one reflective surface side-by-side with different angles for different images.

In the preferred embodiments, images are created based on the relationship between the first reflective means and the second reflective means or other reflective means. The light device can employ any kind of design, shape, display, or geometric arrangement of the more than one reflective means.

Although specific preferred embodiments of the current invention are described above, it is to be appreciated that all alternative, equivalent, same-function and/or same-skill-or-theory variations, modifications, replacements, arrangements, or constructions may still fall within the current scope of the invention.

The invention claimed is:

1. An LED night light having more than one reflective means for reflecting light from at least one LED to create a plurality of LED images, comprising:
    at least one LED;

a first reflective means having a first partially reflective surface; and at least one second reflective means having a reflecting surface for reflecting light from the first partially reflective surface of the first reflective means back to the first reflective means, said first reflective means reflecting said light to obtain multiple reflections of the LED between the two reflection means, wherein said at least one LED is situated on one of said first surface of the first reflective means and said first surface of the second reflective means, wherein said first reflective means is for reflecting light from said at least one LED and from said first surface of the second reflective means to cause multiple reflections of the light from the at least one LED, said multiple reflections of light then passing through said first reflective means such that multiple images of said at least one LED are visible on a second surface of said first reflective means, wherein an arrangement of said multiple images of said at least one LED are visible on said second surface of the first reflective means is determined by a position, distance, angle, or orientation of said first reflective means relative to said second reflective means, and wherein said at least one LED are connected to a power source by conductors and circuitry including means for causing said at least one LED to turn on and off for a predetermined period to provide predetermined functions, colors, and effects.

2. An LED night light with more than one reflective means as recited in claim 1, wherein said first reflective means is selected from the group consisting of a mirror, chrome-finished piece, fine-polished piece, and double-sided mirror.

3. An LED night light with more than one reflective means as recited in claim 1, wherein said see-through properties are provided by a transparent or colored transparent piece of said first reflective means.

4. An LED night light with more than one reflective means as recited in claim 1, wherein said power source is selected from the group consisting of an outlet, batteries, solar power, chemical power, and wind power to provide electricity to drive said at least one LED to emit light beams.

5. An LED night light with more than one reflective means as recited in claim 1, wherein additional reflective means are positioned in three dimensional space at a top and sides of said night light to provide a desired number and arrangement of said images.

6. An LED night light with more than one reflective means as recited in claim 1, wherein said at least one LED is selected from a single or multiple color LED, a multiple piece LED, a standard LED, and a custom LED assembly.

7. An LED night light with more than one reflective means as recited in claim 1, wherein a distance, position, or orientation of said first reflective means relative to said second reflective means is varied to change a number, position, geometric arrangement, or brightness of said plurality of images of said at least one LED.

* * * * *